United States Patent [19]

Hiraishi et al.

[11] Patent Number: 5,351,574
[45] Date of Patent: Oct. 4, 1994

[54] FLYWHEEL

[75] Inventors: Moriji Hiraishi, Ebina; Ichiro Yamazaki, Tokyo, both of Japan

[73] Assignee: Nissan Motor Company, Ltd., Yokohama, Japan

[21] Appl. No.: 72,258

[22] Filed: Jun. 7, 1993

[30] Foreign Application Priority Data

Jun. 8, 1992 [JP] Japan .................................. 4-147617
Mar. 18, 1993 [JP] Japan .................................. 5-058931

[51] Int. Cl.$^5$ .......................... F16F 15/10; G05G 1/00
[52] U.S. Cl. ........................ 74/574; 74/572; 74/604
[58] Field of Search ............... 74/572, 573 R, 574, 74/603, 604

[56] References Cited

U.S. PATENT DOCUMENTS 2,346,372   4/1944   Kishline .................. 74/574

FOREIGN PATENT DOCUMENTS 59-24550    2/1985   Japan .................. 74/574
60-263349   2/1985   Japan .................. 74/574
60-97444    7/1985   Japan .................. 74/574
60-99346    7/1985   Japan .................. 74/574
1-115040    8/1989   Japan .................. 74/574

OTHER PUBLICATIONS

I. Tanishita "Dynamic Vibration Absorber Applied on Crank Shaft", collected papers of the Institute of Mechanical Engineers of Japan, 1937 vol. 6, No. 24, pp. 47–61.

Primary Examiner—Vinh T. Luong
Attorney, Agent, or Firm—Lowe, Price, LeBlanc & Becker

[57] ABSTRACT

A damping mass is housed in a rolling chamber formed in a flywheel body, and executes a pendulum motion in a radial direction according to torque fluctuations. If md is the mass of the damping mass, Id is tile moment of inertia of the damping mass, rd is the radius of tile damping mass, n is the order of torque fluctuations of a rotating drive mechanism, R is the distance from the center of rotation of the body to the center of the pendulum motion of the damping mass, and L is the distance from the center of the pendulum motion of the damping mass to the center of gravity of same, the actual ratio R/L is set larger than a value Ro/Lo obtained from the theoretical relation Ro/Lo=$n^2 \cdot [1 + \{Id/(md \cdot rd^2)\}]$ to reduce rotational fluctuations. In this way, the effect of manufacturing defects and dimensional variations due to wear on rotational fluctuations is reduced.

2 Claims, 3 Drawing Sheets

FLYWHEEL

FIELD OF THE INVENTION

This invention relates to an improvement of a flywheel for reducing torque fluctuations of a rotating drive system such as an engine or the like.

BACKGROUND OF THE INVENTION

In engines wherein a combustion force is converted to a rotational force via a crankshaft, torque fluctuations are inevitably produced in the crankshaft. These torque fluctuations cause rotational fluctuations of rotating members which give rise to vibration or noise. In a four cycle, four cylinder engine, for example, such changes are brought about by a second order torque variation, and in a six cylinder engine by a third order torque variation.

Jikkai Sho 59-24550 published by the Japanese Patent Office discloses a flywheel in which a rolling chamber is formed, this chamber containing a damping mass which is free to roll. The damping mass executes a pendulum motion in a radial direction of the flywheel while rolling on the wall of the rolling chamber as the engine rotates, and thereby displaces the center of gravity.

In such a case, if the distance from the flywheel rotation center to the pivot center of the pendulum motion of the damping mass is R, and the distance from this pivot center to the center of gravity of the damping mass is L, rotational fluctuations of rotating members can be reduced by setting the ratio R/L equal to the square of an engine torque fluctuation of order n.

On pages I-57–I-58 of Kikai Gakkai Koen Ronbunshu (Collected Papers of the Institute of Mechanical Engineers of Japan), (1937), Vol. 6, No. 24, it is disclosed how the dimensions of each member are determined with regard to moment of inertia, and on pages I-47–I-53 of the same reference, a theory is disclosed which takes account of attenuation due to friction when a weight is disposed at an off center position with respect to the center of rotation of the rotating axis.

If the damping mass of a flywheel were also designed taking account of moment of inertia in this way, it would be theoretically possible to provide better reduction of rotational fluctuations.

It is however impossible to completely eliminate manufacturing errors, and there was therefore always a risk of a minor discrepancy arising between the dimensions of a flywheel and optimum values found from theory. In addition, dimensional variations of parts were caused by wear. Moreover, it was difficult to theoretically calculate the attenuation due to friction between the rolling surface of the damping mass and the wall of the rolling chamber, and this value changed with the extent of wear.

Therefore, It was extremely difficult to manufacture a flywheel having dimensions exactly the same as the optimum theoretical values, and to maintain these dimensions over a long period of time.

SUMMARY OF THE INVENTION

It is therefore an object of tills invention to obtain a better reduction of rotational fluctuations from a flywheel having a damping mass.

It is a further object of this invention to determine the dimensions of a flywheel by taking prior account of manufacturing defects and wear in use in order to reduce the adverse effect of these errors and wear on the reduction of rotation fluctuations.

In order to achieve the above objects, this invention provides a flywheel, for use with a rotating drive means experiencing a fluctuating torque, comprising a body formed to be attached to the rotating drive means, a rolling chamber formed in the body, and a damping mass accommodated in the chamber. This damping mass executes a pendulum motion in a radial direction in rolling inside the chamber according to the torque fluctuation of the rotating drive device, A distance R from the center of rotation of said body to the center of the pendulum motion of the damping mass, and a distance L from the center of the pendulum motion of said damping mass to the center of gravity of same are defined by the following equations:

$$-2\% \leq \{(R/L)-(Ro/Lo)\}/(Ro/Lo) < 0\%$$

or $$0\% < \{(R/L)-(Ro/Lo)\}/(Ro/Lo) \leq +50\%$$

$$Ro/Lo = n^2 \cdot \{1 + Id/(md \cdot rd^2)\}$$

where, md is the mass of the damping mass, Id is the moment of inertia of the damping mass, rd is the radius of the damping mass, and n is the order of torque fluctuations of the rotating drive means.

Alternatively, the distances R and L are defined by the following equations:

$$-2\% \leq \{(R/L)-(Ro/Lo)\}/(Ro/Lo) < 0\%$$

or $$0\% < \{(R/L)-(Ro/Lo)\}/(Ro/Lo) \leq +10\%$$

The details as well as other features and advantages of this invention are set forth in the remainder of the specification and are shown In the accompanying drawings.

DESCRIPTION OF THE PREFERRED EMBODIMENTS

Figure 1:
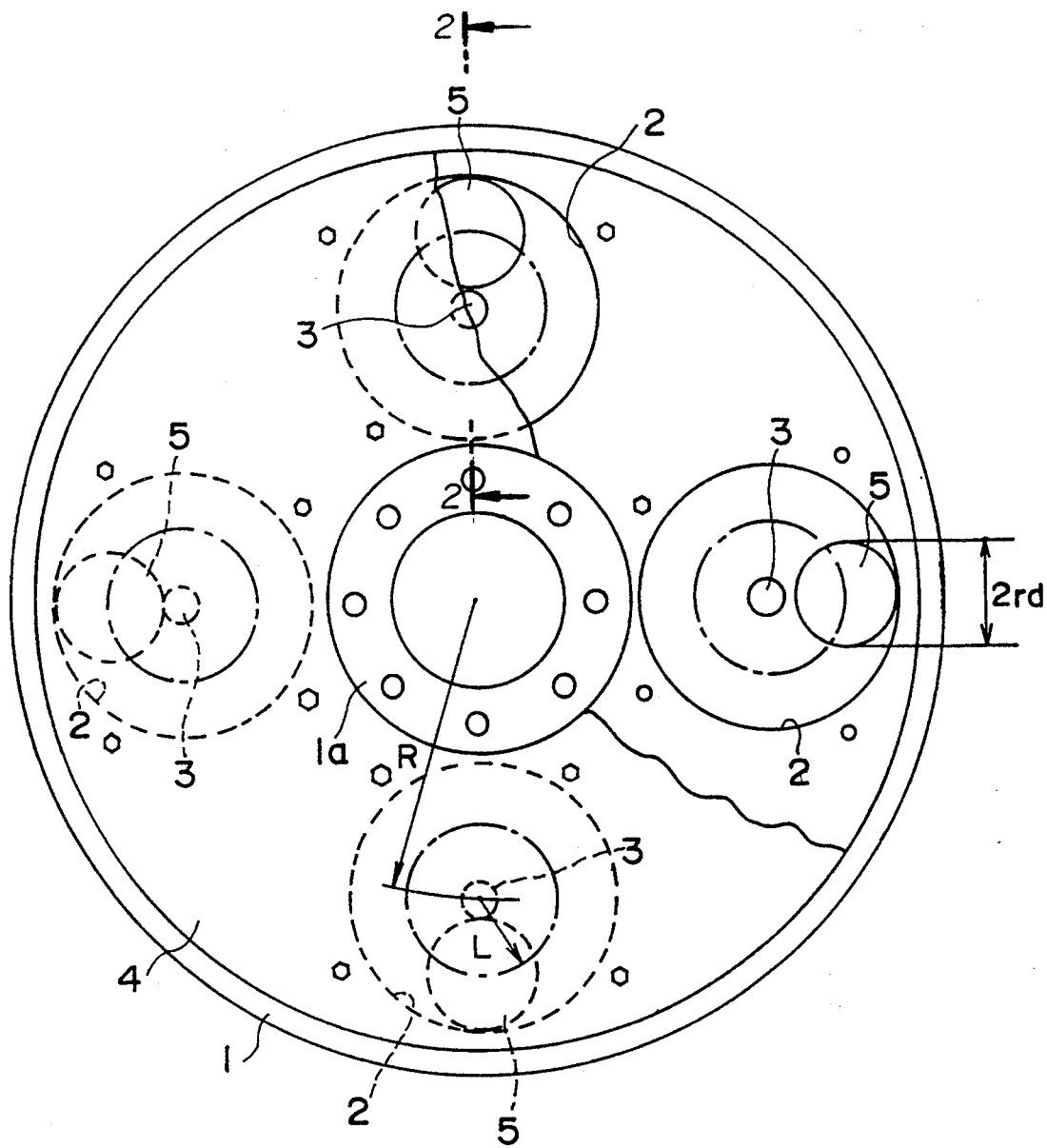
FIG. 1 is a partially broken away plan view of a flywheel according to this invention.

Referring to FIG. 1 of the drawings, a circular flywheel body 1 is provided at its center with an attachment member 1a for attaching the flywheel to an engine, and four rolling chambers 2 having the same shape disposed at equal angles apart on the outer side of the flywheel.

The rolling chambers 2 are provided in the middle of a circular hollow formed in the flywheel body 1, and have center axes 3 parallel to the rotation axis of the flywheel body 1. The hollow is closed by a cover 4.

Figure 2:
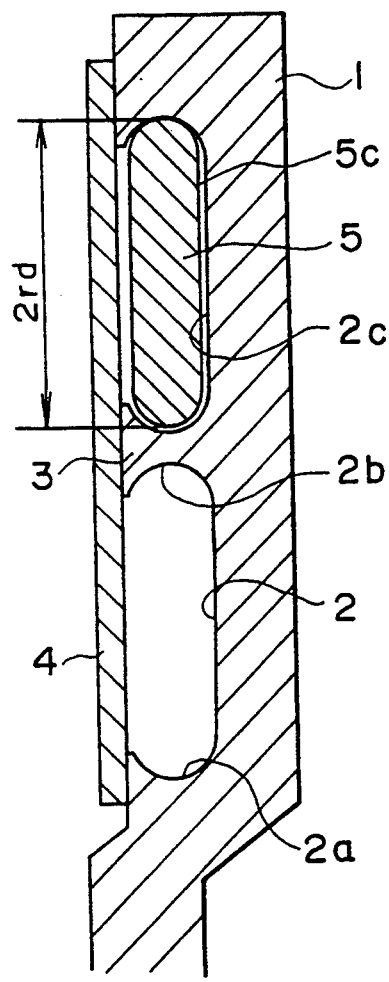
FIG. 2 is a sectional view through the flywheel along line 2—2 in FIG. 1.

As shown in FIG. 2, an inner surface 2a of the rolling chamber 2 is concave on the outer side, and an inner surface 2b is concave on the inner side.

The rolling chamber 2 contains a disk-like damping mass 5 which is free to roll. The diameter of this damping mass 5 is slightly less than the width of the rolling chamber 2, i.e. the distance between the Inner surface 2a and inner surface 2b.

According to this construction, when the flywheel body 1 is rotated, the damping mass 5 rolls on the outer surface 2b of the rolling chamber 2 due to the centrifugal force caused by the rotation and the fluctuation of the drive torque of the flywheel body 1, and executes a pendulum motion in a radial direction with respect to the flywheel body 1.

Figure 3:
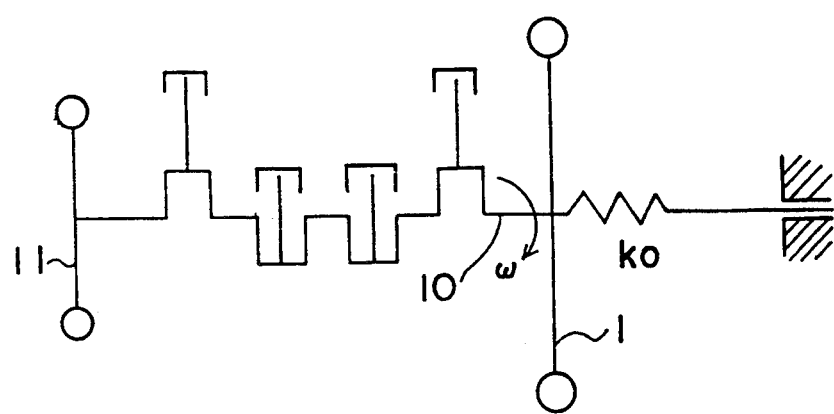
FIG. 3 is a schematic diagram of an engine with the flywheel.

FIG. 3 shows the situation when this flywheel is attached to a crankshaft 10 of a four cylinder engine.

Let the rotation speed of the flywheel 1 be $\omega$, the moment of inertia of the rotation system including the flywheel 1, crankshaft 10 and a crank pulley 11 be $Ip$, the spring constant of the rotating drive system in a screw direction be $Ko$, the radius of the damping mass 5 be $rd$, the oscillation angle of the pendulum motion of the damping mass 5 be $\phi$, the distance from the center of the flywheel body 1 to the center of the pendulum motion of the damping mass 5 be $R$, and the distance from the center of the pendulum motion of the damping mass 5 to the center of gravity of the damping mass be $L$.

When an angular displacement $\theta$ of the flywheel body 1 is produced due to the effect of an nth order torque fluctuation $To \cdot \exp(j \cdot n/\omega \cdot t)$ of the crankshaft 10, the motion equations of the rotation system may be expressed by (1) and (2). According to this example, a plurality of damping masses 5 are provided, so mass $md$ and moment of inertia $Id$ are totals for the plurality of damping masses:

$$\left\{ Ip + R \cdot (R + L) \cdot md + \frac{(L + rd)}{rd} \cdot Id \right\} \cdot \frac{d^2\theta}{dt^2} + \tag{1}$$

$$\left\{ R \cdot L \cdot md - \frac{L \cdot (L + rd)}{rd^2} \cdot Id \right\} \frac{d^2\phi}{dt^2} -$$

$$md \cdot R \cdot L \cdot \omega^2 \cdot \phi + k_0 \cdot \theta = T_0 \cdot \exp(j \cdot n \cdot \omega \cdot t)$$

$$\left\{ L \cdot (R + L) \cdot md - \left( \frac{L}{rd} \right) \cdot Id \right\} \cdot \frac{d^2\theta}{dt^2} + \tag{2}$$

$$\left\{ L^2 \cdot md + \left( \frac{L^2}{rd^2} \right) \cdot Id \right\} \frac{d^2\phi}{dt^2} + md \cdot R \cdot L \cdot \omega^2 \cdot \phi = 0$$

If the coefficient of the attenuation due to friction between the lateral surface of the damping mass 5 and a wall surface 2c of the rolling chamber 2 is c, the motion equations of the rotation system may be represented by (3) and (4):

$$\left\{ Ip + R \cdot (R + L) \cdot md + \frac{(L + rd)}{rd} \cdot Id \right\} \cdot \frac{d^2\theta}{dt^2} + \tag{3}$$

$$\left\{ R \cdot L \cdot md - \frac{L \cdot (L + rd)}{rd^2} \cdot Id \right\} \frac{d^2\phi}{dt^2} -$$

$$md \cdot R \cdot L \cdot \omega^2 \cdot \phi + k_0 \cdot \theta - c \cdot \frac{d\phi}{dt} = T_0 \cdot \exp(j \cdot n \cdot \omega \cdot t)$$

$$\left\{ L \cdot (R + L) \cdot md - \left( \frac{L}{rd} \right) \cdot Id \right\} \cdot \frac{d^2\theta}{dt^2} + \tag{4}$$

$$\left\{ L^2 \cdot md + \left( \frac{L^2}{rd^2} \right) \cdot Id \right\} \frac{d^2\phi}{dt^2} +$$

$$md \cdot R \cdot L \cdot \omega^2 \cdot \phi + c \cdot \frac{d\phi}{dt} = 0$$

Rearranging these equations In terms of the angular displacement $\theta$ of the flywheel body 1, the following equations (5) and (6) are obtained:

$$R_e(\theta) = \left\{ \frac{D \cdot (A \cdot D - B \cdot C) + E^2 \cdot (A + C)}{(A \cdot D - B \cdot C)^2 + E^2 \cdot (A + C)^2} \right\} \tag{5}$$

$$T_0 \cdot \exp(j \cdot n \cdot \omega \cdot t)$$

$$I_m(\theta) = \left\{ \frac{-E \cdot C \cdot (B + D)}{(A \cdot D - B \cdot C)^2 + E^2 \cdot (A + C)^2} \right\} \tag{6}$$

$$T_0 \cdot \exp(j \cdot n \cdot \omega \cdot t)$$

where $\text{Re}(\theta)$ represents the real part of $\theta$, and $\text{Im}(\theta)$ represents the imaginary part of $\theta$. A–E of Equations (5) and (6) are given by:

$$A = -n^2 \cdot \omega^2 \cdot \left\{ Ip + R \cdot (R + L) \cdot md + \left( \frac{L + rd}{rd} \right) \cdot Id \right\}$$

$$B = -n^2 \cdot \omega^2 \cdot \left\{ R \cdot L \cdot md - \frac{L \cdot (L + rd)}{rd^2} \cdot Id \right\} -$$

$$md \cdot R \cdot L \cdot \omega^2$$

$$C = -n^2 \cdot \omega^2 \cdot \left\{ L \cdot (R + L) \cdot md - \frac{L}{rd} \cdot Id \right\}$$

$$D = -n^2 \cdot \omega^2 \cdot \left\{ L^2 \cdot md + \left( \frac{L^2}{rd^2} \right) \cdot Id \right\} + md \cdot R \cdot L \cdot \omega^2$$

$$E = n \cdot \omega \cdot c$$

When rotational fluctuations of the system are zero, the angular displacement $\theta$ of the flywheel body 1 is also zero, so Equations (5) and (6) should therefore be solved under these conditions. The attenuation may include a factor proportional to the displacement, attenuation due to hysteresis and a factor proportional to the speed, and it is thus impossible to calculate the attenuation coefficient c theoretically. The conditions are therefore found for which $\theta$ is zero based on a state wherein the attenuation is not taken Into account.

Assuming that the displacement of the flywheel body 1 and the pendulum motion of the damping mass 5 constitute a harmonic motion, we may write:

$$\theta = \theta_0 \cdot \exp(j \cdot n \cdot \omega \cdot t)$$

$$\phi = \phi_0 \cdot \exp(j \cdot n \cdot \omega \cdot t)$$

Therefore:

$$\frac{d^2\theta}{dt^2} = -n^2 \cdot \omega^2 \cdot \theta$$

$$\frac{d^2\phi}{dt^2} = -n^2 \cdot \omega^2 \cdot \phi$$

Equations (1) and (2) therefore give Equations (7) and (8) below:

$$\left[ -n^2 \cdot \omega^2 \cdot \left\{ Ip + R \cdot (R+L) \cdot md + \frac{(L+rd)}{rd} \cdot Id \right\} + k_0 \right] \cdot \theta_0 + \left[ -n^2 \cdot \omega^2 \cdot \left\{ R \cdot L \cdot md - \frac{L \cdot (L+rd)}{rd^2} \cdot Id \right\} - md \cdot R \cdot L \cdot \omega^2 \right] \cdot \phi_0 = T_0 \quad (7)$$

$$\left[ -n^2 \cdot \omega^2 \cdot \left\{ L \cdot (R+L) \cdot md - \frac{L}{rd} \cdot Id \right\} \right] \cdot \theta_0 + \left[ -n^2 \cdot \omega^2 \cdot \left\{ L^2 \cdot md + \frac{L^2}{rd^2} \cdot Id \right\} + md \cdot R \cdot L \cdot \omega^2 \right] \cdot \phi_0 = 0 \quad (8)$$

Equations (7) and (8) may be expressed in the form of the following Equations (9) and (10):

$$A \cdot \theta_0 + B \cdot \phi_0 = T_0 \quad (9)$$

$$C \cdot \theta_0 + D \cdot \phi_0 = 0 \quad (10)$$

In the aforesaid Equations (9) and (10), A, B, C and D are given by:

$$A = -n^2 \cdot \omega^2 \cdot \left\{ Ip + R \cdot (R+L) \cdot md + \left( \frac{L+rd}{rd} \right) \cdot Id \right\} + k_0$$

$$B = -n^2 \cdot \omega^2 \cdot \left\{ R \cdot L \cdot md - \frac{L \cdot (L+rd)}{rd^2} \cdot Id \right\}$$

$$C = -n^2 \cdot \omega^2 \cdot \left\{ L \cdot (R+L) \cdot md - \frac{L}{rd} \cdot Id \right\}$$

$$D = -n^2 \cdot \omega^2 \cdot \left\{ L^2 \cdot md + \left( \frac{L^2}{rd^2} \right) \cdot Id \right\} + md \cdot R \cdot L \cdot \omega^2$$

Solving Equations (9) and (10):

$$\theta_0 = \frac{D}{(A \cdot D - B \cdot C)}$$

and D=0 is the condition for which the rotation of the flywheel body 1 is zero. In other words, as:

$$-n^2 \cdot \omega^2 \cdot \left\{ L^2 \cdot md + \left( \frac{L^2}{rd^2} \right) \cdot Id \right\} + md \cdot R \cdot L \cdot \omega^2 = 0$$

we may write:

$$md \cdot R \cdot L = n^2 \cdot \left\{ L^2 \cdot md + \left( \frac{L^2}{rd^2} \right) \cdot Id \right\}$$

Dividing both sides by md·L²:

$$\frac{R}{L} = n^2 \cdot \left( 1 + \frac{Id}{md \cdot rd^2} \right) \quad (11)$$

In other words, if R and L are chosen in order to satisfy Equation (11), the angular displacement $\theta$ of the flywheel body 1 can be set to zero in the non-attenuated state.

In practice, however, the attenuation is never zero.

It is thus necessary to choose R and L taking account of the attenuation, however the value of this attenuation cannot be found theoretically as mentioned hereintofore.

A mass matrix [M], elasticity matrix [K] and attenuation matrix [C] are therefore defined as in Equation (12) below:

$$[C] = \alpha \cdot [M] + \beta \cdot [K] \quad (12)$$

In other words, we assume a viscous attenuation (which is proportional to the speed). Here, we shall refer to $\alpha$ when $\beta=0$ as the damping coefficient. It has been found that the attenuation coefficient $\alpha$ found by this definition is effectively identical to the practical value. According to experiments performed by the Inventors, It is confirmed that the attenuation coefficient $\alpha$ has a value lying in the range $0 < \alpha \leq 0.04$.

Figure 4:
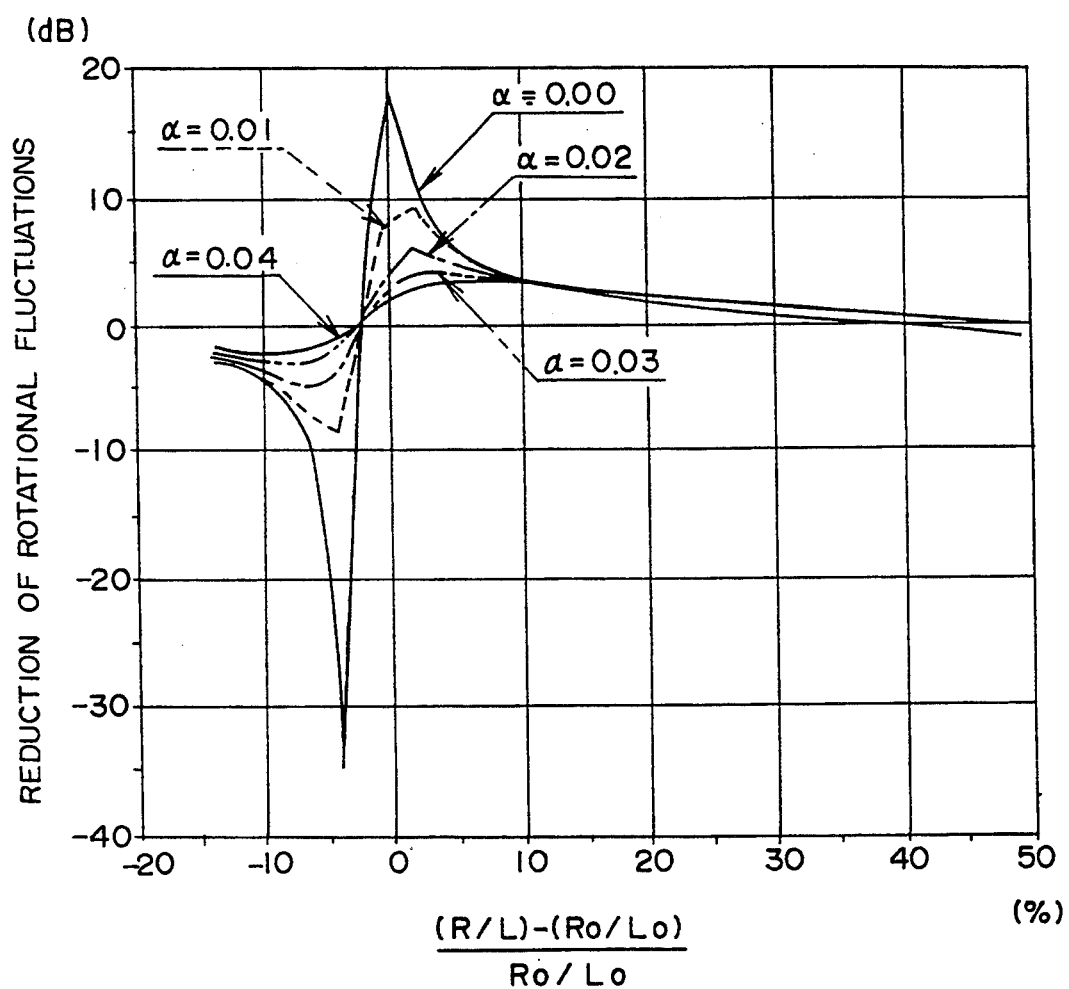
FIG. 4 is a graph showing the relation between the magnitude of the discrepancy from a theoretical value Ro/Lo, and the reduction of rotational fluctuations.

FIG. 4 is a graph showing the relation between the deviation of the actual ratio R/L with respect to the theoretical value Ro/Lo obtained by the aforesaid Equation (11), and the reduction ratio of rotational fluctuations.

This graph was drawn from results of simulations performed by the Inventors. On this graph, the reduction of rotational fluctuations in a conventional flywheel without a damping mass 5 is taken to be 0 dB.

It is seen that when $\alpha=0$, i.e. In the non-attenuated state, the greatest reduction is obtained If the flywheel is manufactured to theoretical dimensions. When the attenuation coefficient $\alpha$ has some value, however, the maximum value of the reduction falls, and the reduction is then a maximum when R/L is greater than the theoretical value Ro/Lo by several percent. The non-attenuated state cannot occur in practice, so rather than manufacturing the flywheel to theoretical dimensions, a better reduction is obtained by aiming at a figure several percent higher.

From FIG. 4, it is seen that the effect of the deviation of the actual ratio R/L from the theoretical ratio Ro/Lo on the reduction of rotational fluctuations, is different according to whether the ratio R/L is greater than the theoretical ratio Ro/Lo (positive difference) or less than the theoretical ratio (negative difference).

In other words, when there is a positive difference, the reduction declines fairly slowly apart from the case of the non-attenuated state, and the reduction is still positive even when tills difference is large. Here It may be noted that according to simulations, it was found that the reduction effect inverted from positive to negative when the difference exceeded 50% excepting in the non-attenuated case.

On the other hand, when there is a negative difference, the reduction decreases fairly sharply, and the reduction effect inverts from positive to negative when the difference is only several percent. According to simulations, in the case of a 4 cylinder engine, the difference is $-2.3\%$ for $\alpha=0.01$, and the difference is $-2.7\%$ for $\alpha=0.02$ at which point the reduction effect inverts from positive to negative. In the case of a 6 cylinder engine, the difference is $-3.0\%$ for $\alpha=0.02$, and the difference is $-2.5\%$ for $\alpha=0.04$ at which point the reduction effect inverts from positive to negative.

Therefore, if the ratio R/L is set to within the range specified by Equation (13) below, the damping mass 5 of the flywheel body 1, which rotates together with the crankshaft 10, executes a pendulum motion irrespective of the magnitude of the attenuation coefficient $\alpha$, without any phase lag due to attenuation, and in synchronism with nth order rotational fluctuations of the crankshaft 10 if any such fluctuations occur (second order for a four cylinder engine and third order for a six cylinder engine). As a result, rotational fluctuations of the crankshaft 10 are effectively reduced, fluctuations of the rotational drive force passed on to a transmission mechanism, not shown, are largely reduced, and noise Inside the vehicle is lessened.

$$-2\% \leq \{(R/L)-(Ro/Lo)\}/(Ro/Lo) < 0\%$$

or $$0\% < \{(R/L)-(Ro/Lo)\}/(Ro/Lo) \leq +50\% \qquad (13)$$

If the ratio R/L lies within the range of Equation (13), rotational motion fluctuations are largely reduced compared to the case of a flywheel without a damping mass 5. As this reduction is still positive even if the difference of the ratio R/L from the theoretical value is large, the value of R/L is chosen to be, for example, about $+10\%$ or $+10-20\%$ higher than the theoretical value when the flywheel is manufactured. This provides a tolerance of at least $\pm 10\%$ in order to maintain a positive reduction effect, and there is then almost no risk that the sign of the reduction will be inverted even if there are some manufacturing defects, If the dimensions of parts change due to wear in use, or If the attenuation coefficient $\alpha$ changes. Further, by setting the ratio R/L to within the range specified by Equation (14) below, not only are rotational fluctuations effectively reduced as in the case when it is set to within the range specified by Equation (13), but also a reduction effect of at least about 3 dB can be obtained:

$$-2\% < \{(R/L)-(Ro/Lo)\}/(Ro/Lo) < 0\%$$

or $$0\% < \{(R/L)-(Ro/Lo)\}/(Ro/Lo) < +10\% \qquad (14)$$

In this case, if for example the ratio R/L is set to $+4-5\%$ higher than the theoretical value in manufacture, a tolerance of about $\pm 5\%$ can be obtained.

Considering the accuracy of current machine technology, e.g. numerically controlled processing or copying lathe processing, the ratio R/L specified by the following equation should be considered as the theoretical value in manufacture.

$$-0.4\% < \{(R/L)-(Ro/Lo)\}/(Ro/Lo) \leq +0.3\%$$

In the aforesaid embodiment, the flywheel body 1 was provided with four rolling chambers 2, but there is no limitation on the number of rolling chambers. Also, the damping mass 5 in the rolling chamber 2 is not necessarily circular, and it may have any form suitable for rolling such as spherical or cylindrical.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. A flywheel, for use with a rotating drive means experiencing a fluctuating torque, comprising:
   a body formed to be attached to the rotating drive means;
   a rolling chamber formed in said body; and
   a damping mass accommodated in said chamber, said damping mass executing a pendulum motion in a radial direction in rolling inside each chamber according to the torque fluctuation of said rotating drive means,
   wherein a distance R from the center of rotation of said body to the center of the pendulum motion of the damping mass, and a distance L from the center of the pendulum motion of said damping mass to the center of gravity of same are defined by the equations:

$$-2\% \leq \{(R/L)-(Ro/Lo)\}/(Ro/Lo) < 0\%$$

or $$0\% < \{(R/L)-(Ro/Lo)\}/(Ro/Lo) \leq +50\%$$

$$Ro/Lo = n^2 \cdot [1+\{Id/(Md \cdot rd^2)\}]$$

where md is the mass of the damping mass, Id is the moment of inertia the damping mass, rd is the radius of the damping mass, and n is the order of torque fluctuations of the rotating drive means.

2. A flywheel, for use with a rotating drive means experiencing a fluctuating torque, comprising:
   a body formed to be attached to rotating drive means;
   a rolling chamber formed in said body; and
   a damping mass accommodated in said chamber, said damping mass executing a pendulum motion in a radial direction as it rolls inside said chamber according to the torque fluctuation of said rotating drive means,
   wherein a distance R from the center of rotation of said body to the center of the pendulum motion of the damping mass, and a distance L from the center of the pendulum motion of said damping mass to the center of gravity of same are defined by the following equations:

$$-2\% \leq \{(R/L)-(Ro/Lo)\}/(Ro/Lo) < 0\%$$

or $$0\% < \{(R/L)-(Ro/Lo)\}/(Ro/Lo) \leq +10\%$$

$$Ro/Lo = n^2 \cdot [1+\{Id/(md \cdot rd^2)\}]$$

where md is the mass of the damping mass, Id is the moment of inertia of the damping mass, rd is the radius of the damping mass, and n is the order of torque fluctuations of the rotating drive means.

* * * * *